INVENTORS
DUANE E. EVANS
LLOYD E. JOHNSON
WILLIAM E. STREIGHT
BY
ATTORNEYS

INVENTORS
DUANE E. EVANS
LLOYD E. JOHNSON
BY WILLIAM E. STREIGHT

ATTORNEYS

Fig-5-
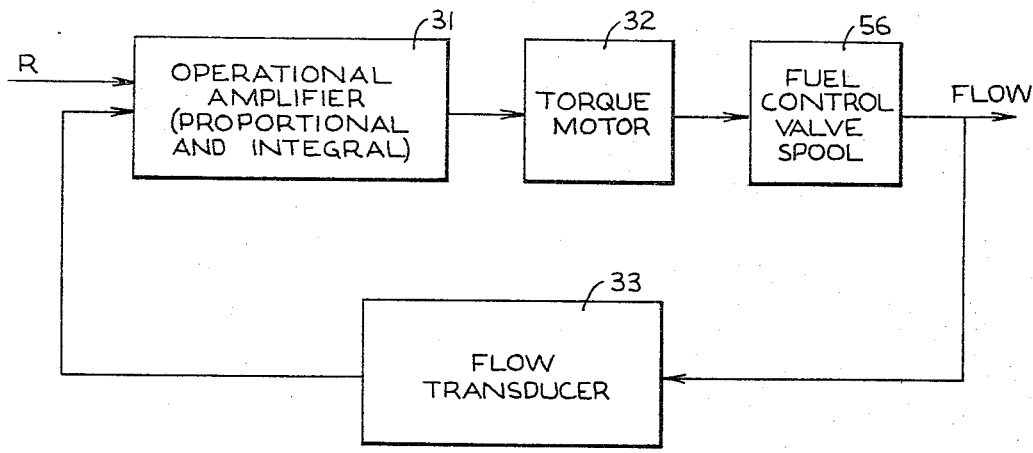
Fig-6-
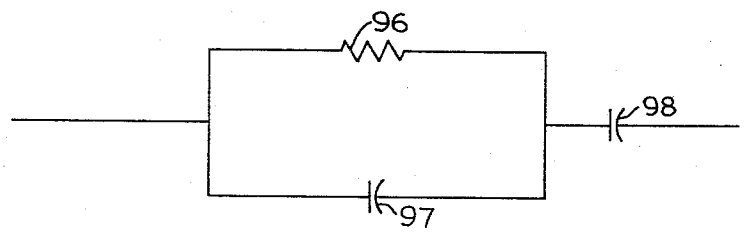

United States Patent Office 3,331,388
Patented July 18, 1967

3,331,388
CONTROL SYSTEM AND FLUID FLOW
TRANSDUCER THEREFOR
Duane E. Evans, Peoria, Lloyd E. Johnson, East Peoria, and William E. Streight, Peoria, Ill., assignors to Caterpillar Tractor Co., Peoria, Ill., a California corporation
Filed May 4, 1965, Ser. No. 453,004
10 Claims. (Cl. 137—486)

The present invention relates to a fluid flow control system and to a transducer for providing an electrical signal which is a function of fluid flow, for use with the control system.

For the past several years there has been considerable activity in the field of gas turbine engines on the part of manufacturers of motor vehicles. One of the basic problems in gas trubine engine operation is to provide fuel to the combustion system as a function of the many design parameters such as acceleration limits, flame-out limits, rotating assembly overspeed limits, temperature limits, etc. By the use of relatively complex electronic and mechanical networks it is possible to take into account all of the parameters mentioned above and extract therefrom a single electrical signal which represents the optimum fuel flow to the engine combustion system under the prevailing operating conditions. In order that the desired fuel flow rate be in fact achieved it is necessary to provide means responsive to the system output signal to regulate fluid flow.

Several attempts have been made to provide open loop systems for controlling fluid flow as a function of an electrical signal but none of these systems have been considered satisfactory for one or more reasons. While open loop systems have been made to operate within satisfactory limits of accuracy, the components necessary to perform in this manner are so expensive as to make the overall system unsatisfactory from an economic standpoint.

In order to provide a fuel flow control system within realistic economic limits the present invention teaches a novel closed loop feedback control system. In order for a feedback control system to achieve an accurate correlation between an input signal and an output quantity it is necessary for the output of the system to be accurately measured and transduced into a signal which corresponds to the input signal. In this way the desired output, as represented by the input signal, can be compared with the actual output, as represented by the feedback signal, and any differences therebetween can be employed to adjust the output.

Accordingly, it is an object of the present invention to provide a system for controlling fuel flow as a function of an electrical signal.

It is another object of the present invention to provide a negative feedback control system for a fuel system of a turbine engine wherein the system is capable of maintaining accuracies of approximately 1%.

A further object of the present invention is to provide a fuel flow transducer which measures fluid flow rate and produces an electrical signal output proportional thereto.

Yet another object of the present invention is to provide a fuel flow control system which has fast response to changes in control signals, operates over a wide range of flow rates, is relatively simple in construction and economical to produce, is relatively insensitive to dirt, is relatively insensitive to temperature changes, is reliable, and is capable of operation with fuels having a wide range of viscosities and densities.

Further and more specific objects and advantages of the present invention are made apparent in the following specification wherein a preferred form of the invention is described by reference to the accompanying drawings.

In the drawings:

FIG. 5 is a block diagram of the entire closed loop control system of the present invention; and FIG. 6 is an electrical schematic diagram of a preferred impedance network for use with the circuit of FIG. 4.

Figure 3:
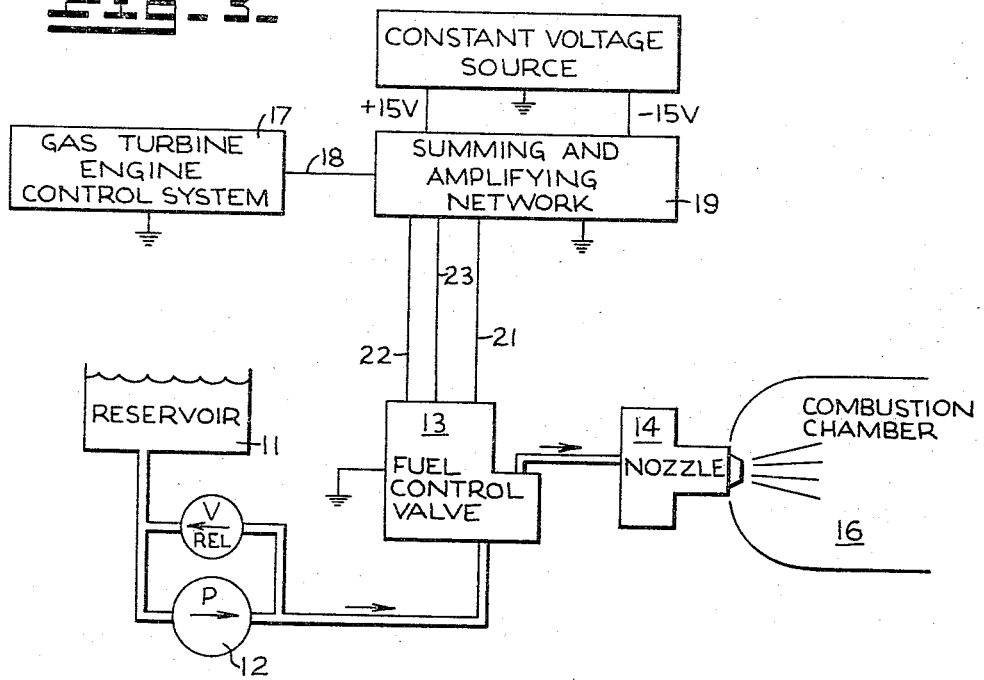
FIG. 3 is a schematic block diagram showing the relationship of the present invention to the overall control system of a gas turbine engine.

Referring now to FIG. 3 a vehicle employing a gas turbine engine includes a fuel reservoir 11 which supplies fuel through a pump 12 and a fuel control valve 13 to a nozzle 14 which introduces the fuel into a combustion chamber 16. The amount of fuel which is introduced into the combustion chamber 16 is controlled by the fuel control valve 13.

A gas truibne engine control system 17 operates to take into account the various parameters which determine how much fuel the system should be receiving and supplies an electrical signal over conductor 18 which is functionally related to the fuel flow rate desired. The signal is received by a summing and amplifying network 19 and from there transmitted over conductor 21 to the fuel control valve 13. The signal on conductor 21 operates to adjust the flow rate of the fuel through fuel control valve 13 by adjusting the position of the valve. The actual fuel flow rate through valve 13 is measured by a transducer whereby electrical signals on conductors 22 and 23 accurately represent the actual fuel rate. The signals on conductors 22 and 23 are compared with the signal from the control system 17 on conductor 18 to determine if the desired output has in fact been established. If there is a discrepancy between the actual output and the desired output, a signal is transmitted over conductor 21 and the position of the valve 13 is adjusted until the desired output is in fact realized.

FIG. 5 illustrates the control system described above in the form of negative feedback control system flow diagram. The forward loop of the control system comprises an operational amplifier 31 which operates as both a proportional and integral amplifier, a torque motor 32, and a valve spool 56 which is positioned by torque motor 32. The feedback loop of the control system includes a flow transducer 33 including attendant electrical circuitry.

A signal R from the engine control system is directed to the operational amplifier 31 where it is acted upon and directed to the torque motor 32. The torque motor responds to an electrical signal by positioning the fuel control valve spool 56 as a function of the electrical signal whereby fuel is made to flow through the control valve to the nozzle. The output flow is measured by the flow transducer 33 and an electrical signal proportional to the flow is directed to the operational amplifier 31 and compared with the signal R. When the feedback signal does not indicate that the output flow is equal to the desired flow as called for by the signal R, the torque motor operates the fuel control valve spool to reposition it until the desired flow is achieved.

By providing a flow transducer 33 which is capable of accurately transducing the actual fuel flow into an electrical signal it is possible to use components in the forward loop of the control system (operational amplifier 31, torque motor 32, and fuel control valve spool 56) which have individual performance accuracies less than the required accuracy for the overall system. Thus, if the characteristic of the torque motor 32 should change due to a change in temperature or a change in internal impedance or for any one of several other possible reasons, the system would still operate to produce the desired flow in response to a given signal R. This result is achieved by the operation of the flow transducer 33 indicating to the system when the output flow differs from the desired flow. Accordingly, the only component which must be itself highly accurate is the flow transducer 33. By providing a flow transducer which operates with extreme accuracy, it becomes possible to construct the entire system economically since the remaining components may be selected to be moderately priced.

Figure 1:
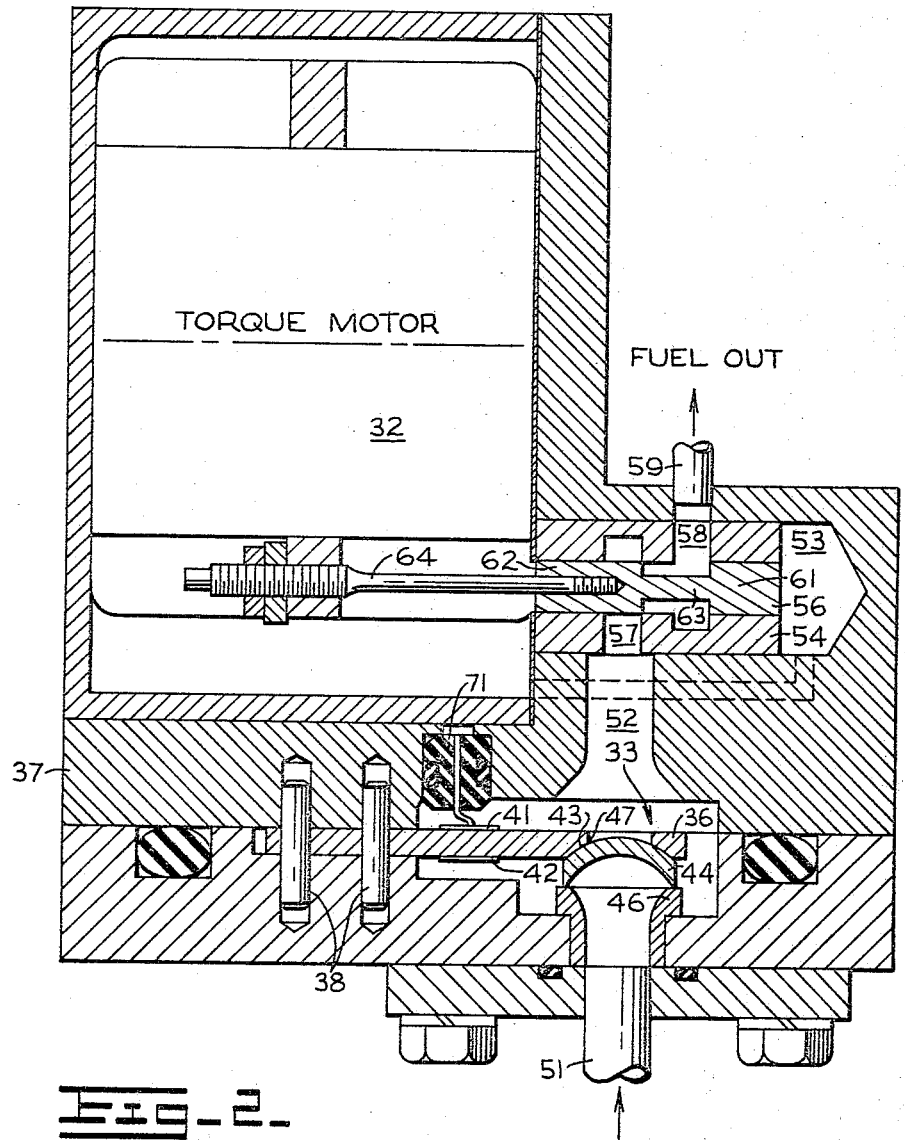
FIG. 1 is a side elevation of a flow control valve and a flow transducer.
Figure 2:
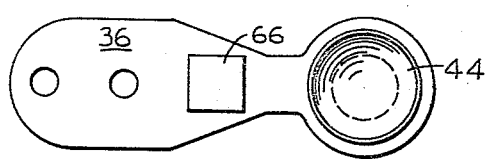
FIG. 2 is a plan view of the fuel flow transducer shown in FIG. 1.

Referring now to FIGS. 1 and 2, the flow transducer 33 of the present invention comprises a cantilevered leaf spring 36 which is mounted in a valve housing 37 and anchored by suitable dowel means 38. While the spring 36 may be formed from any one of several different materials, beryllium copper has proven advantageous due to its low hysteresis and high strength. Bonded to either side of the spring 36, in facing relationship to one another, are a pair of semi-conductor strain gages 41 and 42. While semi-conductor gages are advantageous due to their large gage factor, small size, and long fatigue life, metallic wire or foil gages can also be used without losing the advantages of the invention. The end of spring 36 is formed to have a recessed portion 43 which receives a generally hemispherical poppet type cap 44. The cap 44 engages a valve seat 46 and the abutting surfaces form a fluid seal. The poppet cap 44 may be separate from the spring 36 in order to give it a self-aligning property that guards against fuel leakage past the seal of seat 46 and cap 44. The valve can also be constructed with the cap 44 separate from the spring 36 until the components are assembled. Once the components are assembled and the correct positional relationship between the spirng 36, cap 44 and seat 46 is established the cap can be secured to the spring as by a suitable bond 47.

As fuel is presented at conduit 51 it acts against the cap 44 urging it off the seat 46 and thereby causing the spring 36 to flex. The fuel then passes through passageway 52 to a cylindrical chamber 53 which includes a ported sleeve 54 in which a valve spool 56 is slidably disposed. The sleeve 54 includes an input port 57 which communicates with passageway 52 and an output port 58 which communicates with an output conduit 59. The valve spool 56 comprises a pair of lands 61 and 62 joined by a mid-portion 63 having a reduced diameter as compared to the land portions.

The land portion 62 is joined to a torque motor 32 by a shaft 64. When the torque motor experiences an electrical current it positions the shaft 64 in accordance therewith and in so doing positions the spool 56. The position of spool 56 determines the rate of flow of fuel through the valve. Thus, controlling the current to the torque motor 32 controls the flow of fuel through the valve.

The strain gages 41 and 42 are bonded to the spring 36 in an area generally indicated at 66, in which the stress-strain relationship is linear by virtue of the contour of the spring itself. The gages are very small—in the range of .006 inch wide and .080 inch long—and thus it is not a particular problem to achieve a linear stress-strain relationship. By employing two strain gages in the manner illustrated the electrical signal obtained for a given deflection of the spring 36 is double that which would be obtained from a single gage. It is also possible by using one gage in compression and one in tension, as taught herein, to associate the gages in an electrical circuit which accurately and effectively compensates for changes in temperature which so often result in inaccurate signals. Electrical leads from the gages 41 and 42 lead out of the housing 37 through a suitable insulator and seal means shown generally at 71.

Figure 4:
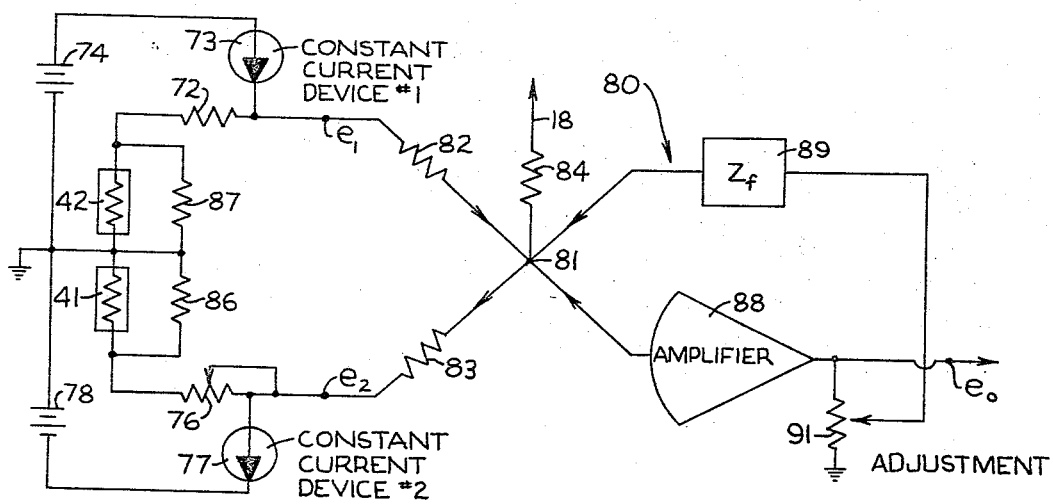
FIG. 4 is an electrical schematic diagram of a portion of the closed loop control system of the present invention.

Referring now to FIG. 4, the strain gage 42 is electrically joined to a resistor 72 and a constant current device 73. The constant current device 73 looks to a regulated voltage supply 74 for energization. The strain gage 41 is electrically joined in series to a resistor 76 and a constant current device 77 wherein the constant current device looks to a regulated voltage source 78 for its energization. The magnitude of the voltage from source 78 is equal to that of source 74, but opposite in polarity. By using matched constant current devices and electrically joining the junction between strain gages 41 and 42 to ground it is possible to insure essentially identical current flow through the two strain gages but in opposite directions. The output signal from the strain gages is established at a juncture 81 which is electrically joined to the juncture between resistor 72 and constant current device 73 by a resistor 82, and to the juncture between variable resistor 76 and constant current device 77 by a resistor 83. Resistors 82 and 83 are a matched pair having identical resistance values. When the transducer spring 36 is in a position for no fuel flow, the resistance of gage 41 and variable resistor 76 will be made equal to the resistance of gage 42 and fixed resistor 72 by varying variable resistor 76. Thus, the voltage drop across resistor 72 and gage 42 will be equal to the voltage drop across resistor 76 and gage 41. Therefore, the voltages established at the points marked $e_1$ and $e_2$ are equal, but opposite in polarity, resulting in zero voltage at junction 81.

When flow occurs through the fuel valve 13 and the spring 36 is deflected in response thereto, the gage 41 is placed in compression while the gage 42 is placed in tension. This results in an increase in the resistance value of the gage 42 and a decrease in the resistance value of the gage 41. This causes the voltage at $e_1$ to become more positive and the voltage at $e_2$ to become less negative. Since resistors 82 and 83 are a matched pair, the voltage at junction 81 would no longer be zero but instead some positive value proportional to the change in resistive value of the strain gages were it not for the corrective current produced by operational amplifier 31 in generating the signal which positions the torque motor. Thus, current signals are produced in the flow transducer circuit proportional to the fuel flow through the control valve. Accordingly, a change in the resistive values of the strain gages 41 and 42 in response to deflection of the spring 36 produces equal changes in voltages at $e_1$ and $e_2$ which are a measure of the deflection of spring 36 and which unbalance the current flow through resistances 82 and 83 in an amount proportional to fuel flow through the valve.

A change in resistive value of gages 41 and 42 also takes place in response to a temperature or pressure change and it is desired that these changes not affect the current flow balance through resistances 82 and 83. Temperature or pressure changes do not, in fact, result in a change in current at junction 81 with the circuit taught by the present invention, because the resistive values of gages 41 and 42 change in the same direction for a given temperature or pressure change. Thus, while a temperature or pressure change may result in the resistive value of gages 41 and 42 simultaneously increasing or decreasing this will not only result in equal changes of voltages at $e_1$ and $e_2$ but the absolute or total magnitude of the voltages will remain unchanged. As long as the voltage changes at $e_1$ and $e_2$ are equal one to the other, but of opposite sign, the current balance at the junction 81 will remain unchanged in spite of a change in the temperature of the strain gages. Accordingly, the use of the two strain gages in opposing relationship as taught by the present invention provides effective temperature and pressure compensation as a built-in characteristic of the transducer. Alternate temperature and pressure compensation networks using constant voltage devices are also feasible with the present invention.

By having a variable resistor 76, it can be employed to adjust the system so that the current flows at junction 81 are in balance for zero signal to operational amplifier 31 when there is no signal from control 17 and no fuel flow. Additional temperature compensation is achieved by paralleling each of gages 41 and 42 with matched resistors 86 and 87, respectively.

The junction 81 also receives the electrical signal from the gas turbine engine control system 17 via conductor 18 through resistor 84. As previously described, the signal on conductor 18 represents the desired fuel flow. The signals from the strain gages plus the control signal are combined and presented to an operational amplifier 80 which includes a very high gain amplifier 88 and a feedback impedance 89. The feedback impedance 89 is electrically joined to the output of the amplifier 88 through a variable resistor 91 which is employed to select a desired gain. The output signal $e_0$ from the amplifier 88 is directed to the torque motor 32 as previously described with reference to FIG. 5.

Referring now to FIG. 6, a parallel combination of resistor 96 and capacitor 97 (which is primarily a high frequency filter) joined in series with a capacitor 98 is advantageously employed as the impedance 89 for the feedback loop of the operational amplifier 80. By employing this particular feedback impedance circuit and the previously discussed strain gage electronic circuit the operational amplifier is operative to sum the strain gage signal, combine the summed strain gage signals with the input signal over conductor 18, produce an output signal $e_0$ which is proportional to the error signal resulting from such a comparison between the input signal on conductor 18 and the summed strain gage signals established at junction 81, and integrate the error signal to zero by changing $e_0$ with respect to time. Since these functions are normally performed by more than a single operational amplifier the particular feedback impedance network and the previously discussed strain gage electronic circuit taught by the present invention significantly reduce the cost of the overall system by eliminating one or more operational amplifiers.

We claim:

1. A transducer for providing an electrical signal as a function of fluid flow through a fluid opening, comprising in combination:
   a leaf spring having one end fixed against movement in any direction and one free end;
   valve means associated with the free end of said spring and the fluid opening whereby said spring is strained in response to flow through the fluid opening; and
   strain gage means secured to said spring whereby deflection of said spring operates to change the electrical characteristics of said gage means.

2. The transducer of claim 1 wherein said strain gage means comprises two strain gages secured on opposite sides of said leaf spring whereby one gage is in compression and one gage is in tension when said spring is deflected.

3. The transducer of claim 2 wherein said leaf spring is formed of beryllium copper.

4. The transducer of claim 2 wherein said strain gages are semi-conductors.

5. A fuel flow control system comprising in combination:
   means for establishing an electrical signal representing a desired fuel flow;
   electrical circuit means disposed to receive the signal from said first named means and provide an electrical signal output in response thereto;
   electro-mechanical positioning means disposed to receive the output from said circuit means;
   fuel flow valve means having a positionable member which regulates fluid flow therethrough, said valve means connected to said electro-mechanical positioning means whereby the position of said positionable member is controlled by said electro-mechanical positioning means; and
   flow transducer means disposed to measure fluid flow through said valve means and produce an electrical signal which is a function thereof, the electrical signal of said flow transducer means being directed to said circuit means for comparison with the signal from said first named means, said circuit means operable to produce an error signal as a function of any differences between the two signals directed thereto.

6. The fuel flow control system of claim 5 wherein said transducer means comprises a leaf spring having one end fixed and one end free whereby said spring can be deflected, and strain gage means secured to said leaf spring for establishing an electrical quantity which is a function of the deflection of said spring.

7. The control system of claim 5 wherein said electrical circuit means comprises a very high gain amplifier, and an impedance network in electrical parallel with said amplifier, wherein said impedance network comprises a capacitor in series connection with a parallel circuit of a resistor and a capacitor.

8. The control system of claim 5 wherein said transducer means comprises:
   a leaf spring with one of its ends fixed and its other end free, said spring disposed in the fuel flow path of said valve means and deflected as a function of flow rate;
   a pair of strain gages bonded on either side of said spring whereby one gage is in compression and one gage is in tension when said spring is deflected, said gages responsive to compression or tension by a change in resistive value; and
   circuit means, including said gages, providing an electrical signal which is a function of the resistive values of said gages.

9. The control system of claim 5 wherein said circuit means includes a temperature compensation network means.

10. The control system of claim 8 wherein said circuit means comprises:
   an electrical connection between said gages which leads to ground;
   a pair of constant current devices, one electrically joined to each of said gages and operative to direct current through said gages;
   a first resistor connecting the junction between one of said constant current devices and its associated strain gage to an electrical junction point;
   a second resistor connecting the junction between the other one of said constant current devices and its associated strain gage to the electrical junction point.

References Cited

UNITED STATES PATENTS

| | | | |
|---|---|---|---|
| 941,053 | 11/1909 | Young | 73—228 |
| 3,011,343 | 12/1961 | White et al. | 73—210 |
| 3,212,330 | 10/1965 | De Pollier | 73—228 |

M. CARY NELSON, *Primary Examiner.*

R. C. MILLER, *Assistant Examiner.*